No. 611,074. Patented Sept. 20, 1898.
G. H. MOWE.
CATCH BASIN AND SEWER TRAP.
(Application filed Mar. 16, 1898.)
(No Model.)
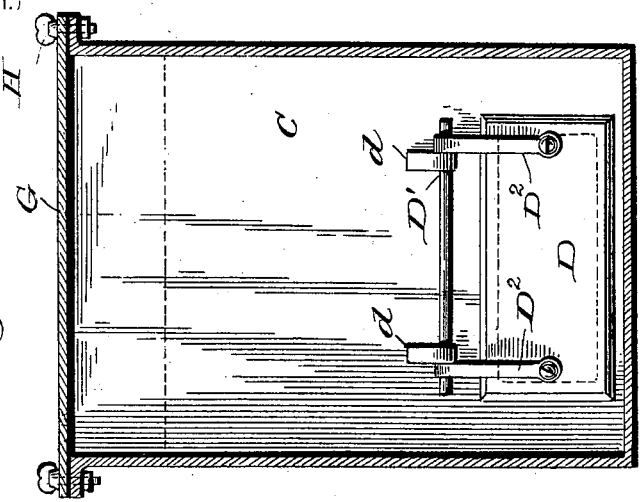
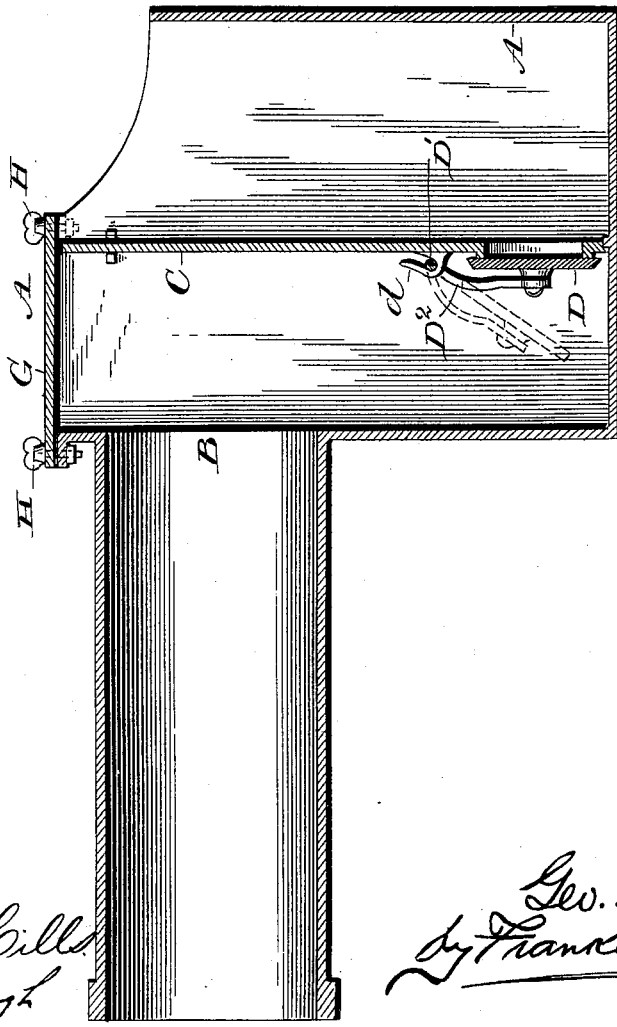
Witnesses
L. C. Hills
A. L. Hough
Inventor
Geo. H. Mowe,
by Franklin H. Hough
Attorney
THE NORRIS PETERS CO., PHOTO-LITHO., WASHINGTON, D. C.

UNITED STATES PATENT OFFICE.

GEORGE H. MOWE, OF WATERTOWN, NEW YORK.

CATCH-BASIN AND SEWER-TRAP.

SPECIFICATION forming part of Letters Patent No. 611,074, dated September 20, 1898.

Application filed March 16, 1898. Serial No. 674,088. (No model.)

*To all whom it may concern:*

Be it known that I, GEORGE H. MOWE, a citizen of the United States, residing at Watertown, in the county of Jefferson and State of New York, have invented certain new and useful Improvements in Catch-Basins and Sewer-Traps; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in water-seal traps; and it is my aim to produce a trap of this character which may be located in cellars or in streets and arranged to receive drainings and allow the same to pass freely into a sewer, which may be connected to the trap, and at the same time all foul odors or gases are prevented from escaping through the trap into the outside atmosphere.

A further part of the present invention resides in the provision of a vertically-disposed partition in and forming a part of the trap, which partition carries a valve and is capable of being removed from the trap for the purpose of making access easy to the pipe leading to the sewer should the pipe become clogged up.

The invention will be clearly understood when taken in connection with the drawings which form a part of this application, and in which drawings similar letters of reference indicate like parts throughout both views, in which—

Figure 1 is a vertical central sectional view through the trap, valve, removable partition, and sewer-pipe connection. Fig. 2 is an elevation of the slide-partition which carries the valve.

Reference now being had to the details of the drawings by letter, A designates the box of the trap, which has an open top, and the open end of the box is cut away slightly, as shown in the drawings. Leading from the said box is a pipe B, which may be connected with the sewer. Held vertically in the box and made to be removable therein is the partition C, which partition carries at or near its lower end a swinging valve D below the water-level in the box or catch-basin. The said valve is hinged at D' to the hooks $d$ and allowed to swing toward the sewer connection, as shown. The upper portion of the said catch-basin, between the partition and the side of the box from which the pipe to the sewer leads, is provided with a cover G, which is secured to the box and partition by means of thumb-screws H.

From the foregoing it will be noted that a trap constructed in accordance with my invention will prevent the escape of all offensive odors and gases, will form a catch-basin where sediment of all kinds can be caught and easily removed, and by the removal of the partition carrying the hinged gate or valve access may be had to the sewer-pipe in case of any stoppage in the sewer beyond the trap.

The low-cut portion of the catch-basin is sufficiently above the lowest portion of the pipe leading to the sewer so that the water in the catch-basin may rise in the basin sufficiently high to allow it to escape into the sewer.

Having thus described my invention, what I claim to be new, and desire to secure by Letters Patent, is—

In a catch-basin and sewer-trap, the combination with the basin, of the removable partition vertically disposed therein, the lower portion of said partition having an elongated opening therein, a flange about said opening at right angles to the face of the partition, of the hooks and bar loosely held thereon, of the valve-plate lugs thereon with threaded apertures therein, the arms $D^2$, carried by said rod, and secured to the lugs of the plate by means of screws, of the cover fitted over the removable partition and edge of the basin, a portion of the basin being left open at the top and cut away, as shown and described.

In testimony whereof I affix my signature in presence of two witnesses.

GEORGE H. MOWE.

Witnesses:
  W. R. TASSEY,
  J. O. HATHWAY.